June 21, 1966 J. G. WRIGHT ETAL 3,256,965
FASTENER FORMING AND INSERTING MACHINE
Original Filed Jan. 29, 1963 4 Sheets-Sheet 1

INVENTORS
JOHN G. WRIGHT &
ROY E. SMITH
BY Channing P. Richards &
Dalbert U. Shefte
ATTORNEYS INVENTORS
JOHN G. WRIGHT &
ROY E. SMITH
BY
Channing L. Richards &
Dalbert U. Shefte
ATTORNEYS

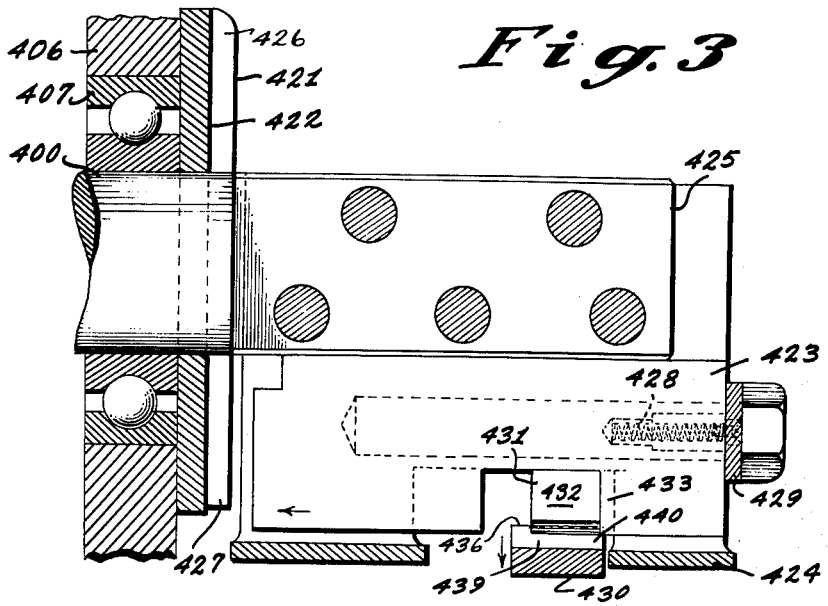
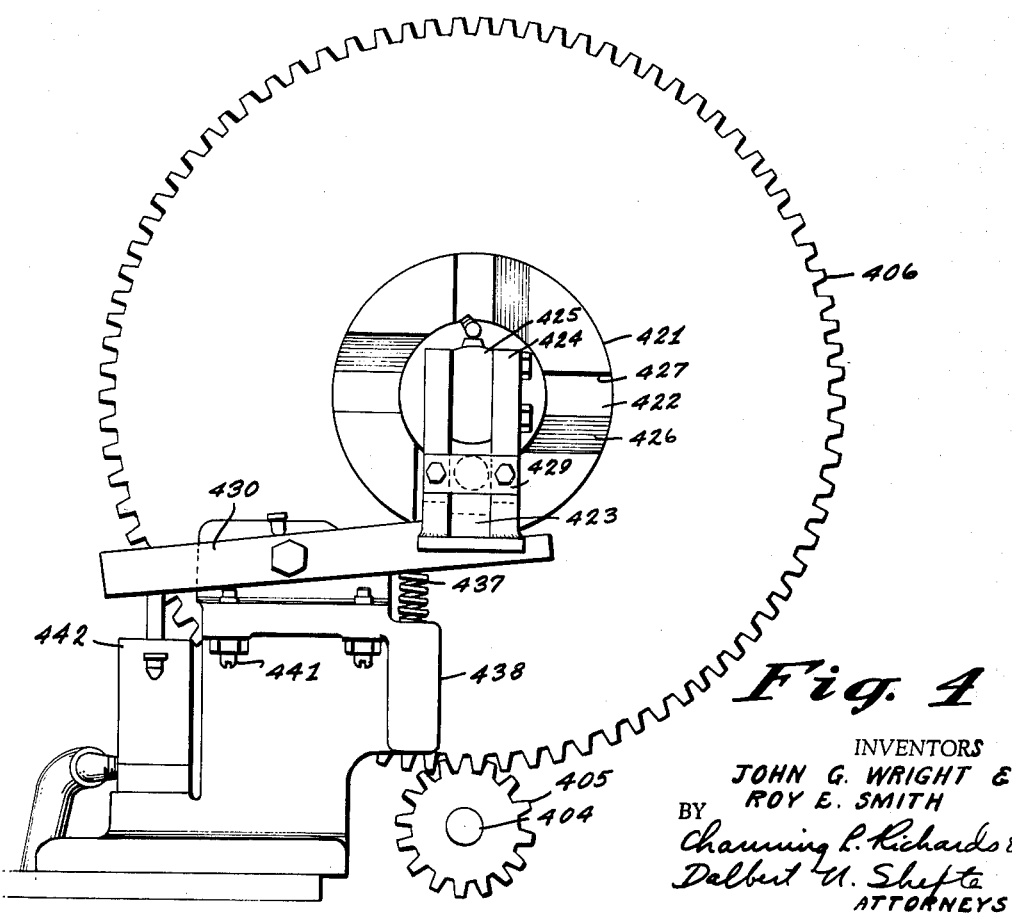

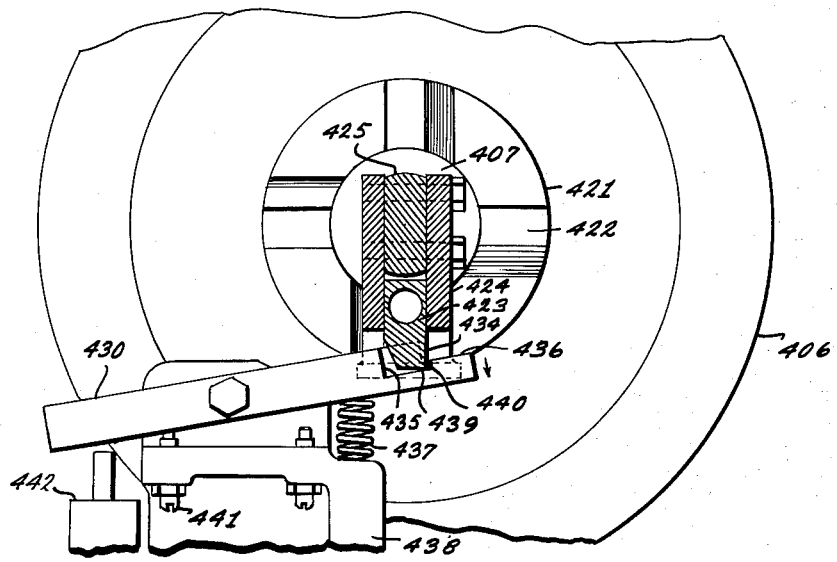
Fig. 5
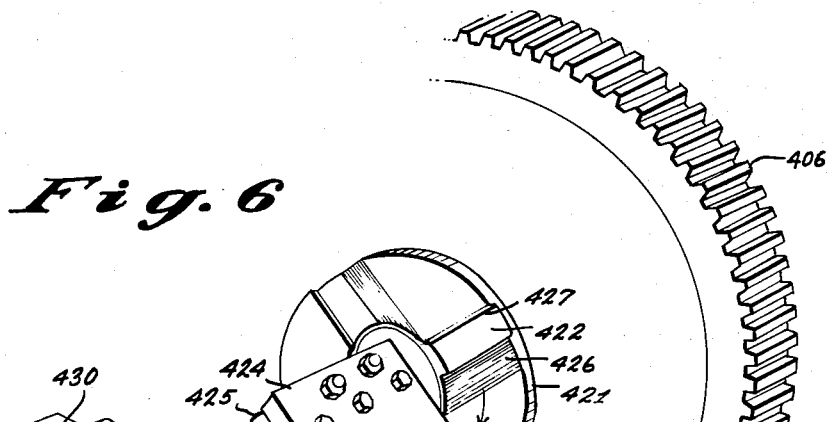
Fig. 6
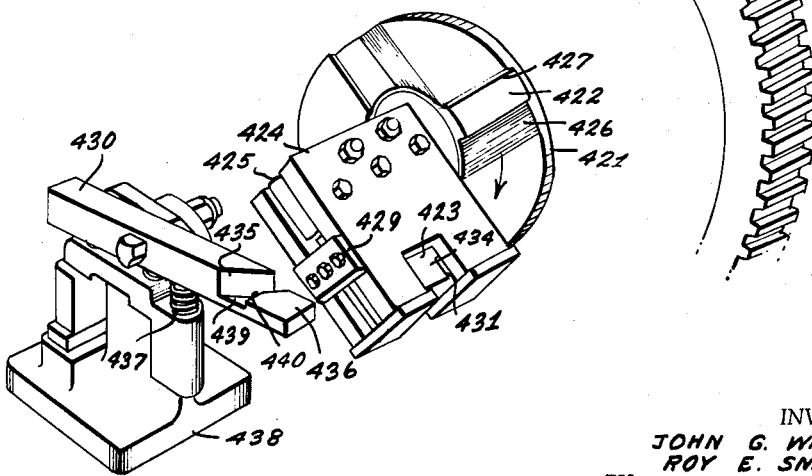
INVENTORS
JOHN G. WRIGHT &
ROY E. SMITH
BY
*Channing P. Richards &
Dalbert U. Shefte*
ATTORNEYS 3,256,965
FASTENER FORMING AND INSERTING
MACHINE
John G. Wright and Roy E. Smith, Atlanta, Ga., assignors to The Auto-Soler Company, a corporation of Georgia
Original application Jan. 29, 1963, Ser. No. 255,155. Divided and this application Apr. 15, 1965, Ser. No. 448,473
2 Claims. (Cl. 192—25)

The present application is a divisional application of copending application Serial No. 255,155, filed January 29, 1963.

This invention relates to machines of the type in which wire is fed in a continuous length from a reel supply to have fasteners formed successively therefrom, and in which each of the successively formed fasteners is driven or inserted in material to be secured as a following phase of a cyclic fastener forming and inserting operation.

More particularly, the present invention is concerned with a machine of the foregoing type that incorporates a unique rearrangement of the basic structural and operating relations to provide for the formation and insertion of much longer and heavier fasteners than has heretofore been possible with such machines.

Thus, the machine of the present invention is capable of forming fasteners from 8 or 10 gauge wire in any length up to 5¼ inches, which is equivalent to a forty-penny length, and may accordingly be employed to exceptional advantage for nailing heavy duty structures such as skids or shipping pallets or truck platforms; for producing housing sub-components of all sorts; and for use otherwise in any instance where a long and substantial fastener is needed or desirable, as in the securing of plywood sheets in stacks for production sawing.

Briefly described, the machine is rearranged according to the present invention to control and actuate the cyclic fastener forming and inserting operation conveniently and effectively despite the relatively great operating forces that must be transmitted and directed.

The features of the present invention are described at further length below in relation to the accompanying drawings, in which:

FIG. 3 is a vertical sectional view of the right-hand portion of the cam operating shaft of FIG. 2 showing the clutch means for selectively rotating the shaft;

FIG. 4 is an end view of the clutch means illustrated in FIG. 3;

FIG. 5 is an intermediate vertical sectional view of the clutch means of FIG. 4 taken parallel to FIG. 4; and FIG. 6 is a perspective view of the clutch means of FIGS. 4 and 5.

Figure 1:
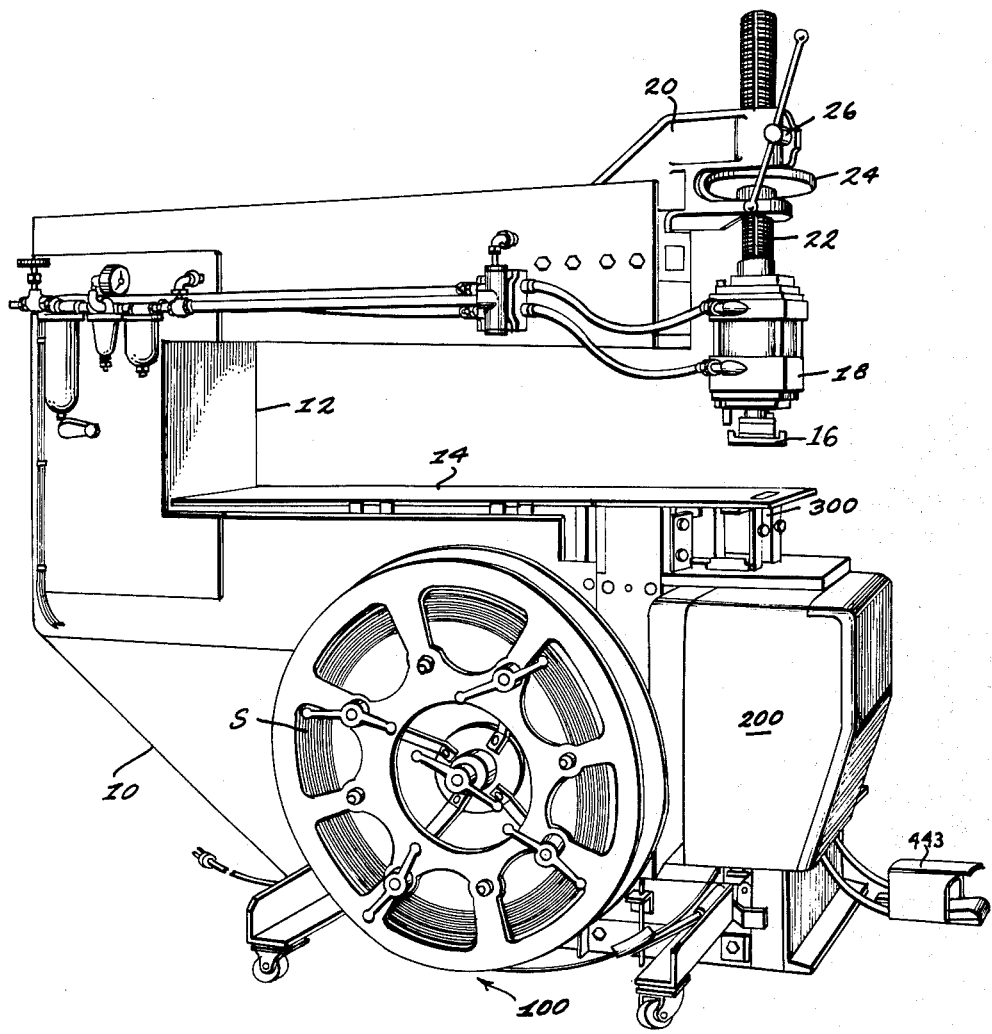
FIG. 1 is a left-side perspective view of a fastener forming and inserting machine according to one embodiment of the present invention.

In the illustrated embodiment, the basic arrangement comprises a frame structure, as indicated generally by the reference numeral 10, which is preferably formed to provide a laterally extended throat portion at 12 for accommodating work of considerable breadth in a manner comparable to that disclosed in U.S. Patent No. 3,023,412, issued March 6, 1962. Forwardly and at the lower side of this throat portion 12, a work supporting table 14 is arranged to carry work for insertion of fasteners upwardly therein against the clamping force of an overhead anvil 16, which is carried by the piston rod of a double-acting cylinder and piston unit 18 that is operated in the manner of an "air motor" to force the anvil 16 downwardly for work clamping action during fastener insertion, while maintaining it retracted upwardly so as to clear the work at other times. The anvil 16 and associated cylinder and piston unit 18 are hung from a supporting bracket 20 at the top of the frame structure 10 through a threaded shank 22 that is engaged by a handwheel 24 for adjusting the height of the anvil 12 above the work table 14 to suit the work being handled; the supporting bracket 20 being fitted with a binding screw at 26 that may be tightened for holding the threaded shank 22 at a selected adjustment.

Figure 2:
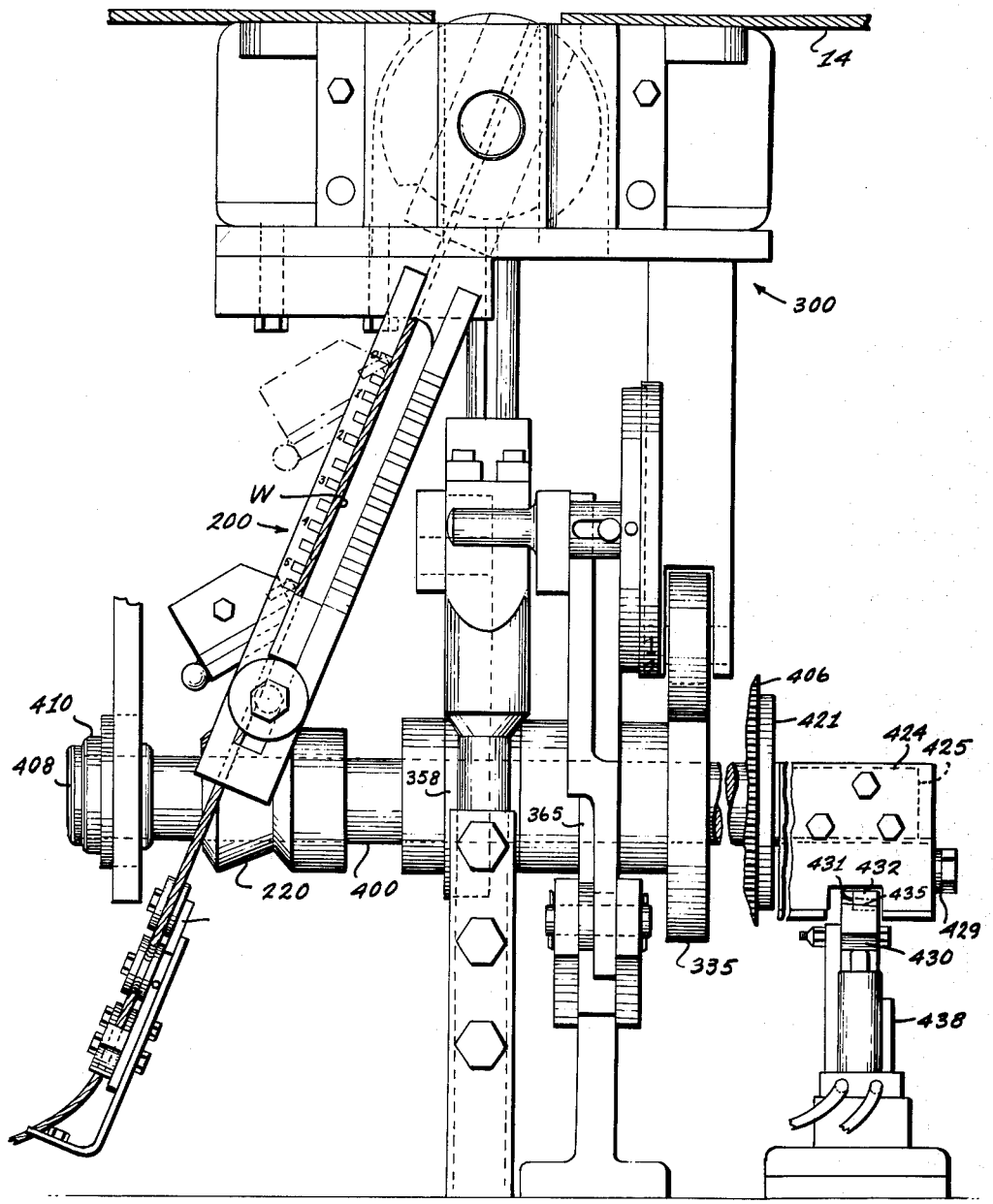
FIG. 2 is a front elevational view of the fastener forming and inserting machine of FIG. 1 with the front of the housing removed for illustration of machine components within the housing.

The supply S of wire W that is to be fed to the machine is arranged at one side thereof on a reel structure as indicated generally at 100 in FIG. 1, and feeding of the wire W is accomplished by a feed mechanism that is located adjacently on the frame structure 10 as indicated generally at 200 in FIG. 2. The fastener forming knife mechanism, which receives the feed wire W, is arranged directly below the work table 14 as seen at 300 in FIG. 2, and the cyclic fastener forming and inserting operations are actuated by a drive system that delivers through an operating shaft 400.

The wire feed mechanism 200, fastener forming knife mechanism 300, and fastener inserting means are each actuated by respective cams mounted on the operating cam shaft 400. Thus the wire feed mechanism actuating cam 220, the fastener forming knife operating cam 335, and the fastener insertion stroke operating cam 358 and retraction stroke operating cam 365 of the fastener inserting means are all mounted on the common operating shaft 400. This results in a compact driving mechanism for operating all of the machine operations and simplifies the arrangement of the cams in timed relation for proper sequential actuation of the various machine operations. In addition, the mounting of the knife mechanism operating cam 335, the fastener insertion stroke operating cam 358 and the retraction stroke operating cam 365 on the common operating shaft 400 permits these cams to be arranged contiguously for interconnection to distribute the operating loads therebetween.

The operating shaft 400 is cyclically rotated to effect operation of the various machine components by a drive motor (not shown) that continuously rotates through suitable driving connection an intermediate shaft 404, which carries a pinion 405 drivingly engaging the gear teeth on a fly wheel 406 mounted for free rotation on a bearing 407 concentrically with the operating shaft 400, with the fly wheel selectively connectable to the operating shaft 400 for selective cyclical rotation thereof through clutch means which will be described in detail further below.

The operating shaft 400 and associated fly wheel 406 are retained against axial thrusts in proper operating orientation with respect to the other machine components by a thrust cap 408 mounted on the opposite end of the shaft in contact with a bearing mounting 410 for retention of the shaft in proper axial disposition. This thrust cap 408 is disclosed in detail and claimed in the aforementioned copending application Serial No. 255,155 of which this is a division.

The clutch means for transmitting rotation of the continuously rotating fly wheel 406 to rotation of the operating shaft 400 includes an annular clutch plate 421 fixed to the fly wheel 406 concentric with the operating shaft 400 for continuous rotation with the fly wheel, and has four equidistant radially extending clutch pin or dog engaging slots 422 for engagement by a clutch pin 423 longitudinally slidable in a housing 424 secured to and extending radially from the flattened end 425 of the operating shaft 400. The clutch pin 423 is slidable into and out of slot engagement for selectively engaging and disengaging the operating shaft 400 from the fly wheel drive.

The leading edges 426 of the clutch plate slots 422 taper inwardly to allow the clutch pin 423 to slide easily into the slots, while the trailing or driving edges 427 of the slots are parallel with the clutch pin for positive driving connection when the pin is engaged in the slot. The clutch pin 422 is biased in clutch plate slot engaging position by a spring 428 having an end mounted in a longitudinal bore of the pin and having its other end biased against a cross plate 429 at the outer end of the clutch pin housing 424.

The clutch pin or dog 423 is moved longitudinally outwardly away from the clutch plate 421 for disengagement of the operating shaft 400 from the fly wheel drive by a clutch release lever 430 that is movable into and out of the path of the clutch pin. To accomplish this clutch release manipulation of the clutch pin 423, the clutch pin is formed with an intermediate slot 431 having a lever engaging surface 432 extending from the flat front surface 433 of the pin toward the rear flat surface 434 thereof at an inclination toward the clutch plate 421. The housing 424 is open adjacent this inclined surface 432 to expose the surface for engagement by the clutch release lever 430, which is provided with a complementary inclined surface 435 in the path of the clutch pin surface. This clutch release lever inclined surface 435 is inclined outwardly in the direction of clutch pin advance so that upon engagement of the complementary inclined surfaces the clutch pin will be wedged axially outward by the interaction of the inclined surfaces to disengage the clutch pin from the clutch plate and stop the clutch pin 423 and operating shaft 400 when the pin abuts the aforementioned cross plate 429 of the clutch pin housing, which prevents further outward sliding of the clutch pin on the clutch release lever, thereby stopping operation of the machine at the end of a cycle. In this regard it should be noted that the radial location of the clutch pin 423 on the operating shaft 400 and the pin stopping position of the clutch release lever 430 are related to the knife assembly operating cam 335 carried on the operating shaft 400 so that the operating cycle is stopped with the knife assembly mechanism follower cam at the beginning of the dwell surface at which the knife assembly is in wire receiving position, the machine having thus completed a fastener insertion cycle and being in position to begin a subsequent cycle.

The clutch release lever 430 of the present invention is additionally constructed advantageously for positively retaining the clutch pin in disengaged position and preventing accidental back-up when the clutch pin strikes the clutch release lever. For this purpose, the clutch release lever 435 is formed with a leading pin engaging surface 436 in advance of the inclined surface 435 and extending generally tangentially through the path of the clutch pin so that as the clutch pin 423 advances it engages this surface 436 and causes slight depression of the clutch release lever 430 against the biasing of a vertical spring 437 that extends from the underside of the lever to a lever mounting bracket 438 on which the lever is intermediately pivoted. The clutch release lever is formed with a transverse slot 439 at the inclined surface 435 between that surface and the leading surface 436 and extending to a depth below the leading surface. This slot 439 is shaped to receive the clutch pin 423, having a flat upstanding surface 440 for engaging behind the rear flat surface 434 of the clutch pin 423 when the clutch pin has been fully disengaged by the co-action of the inclined surfaces at which time the clutch pin is received in the slot 439 to permit partial return of the depressed clutch release lever so that the clutch pin is fully seated in the slot, with the flat surface thereof contacting the rear flat surface of the clutch pin and preventing back-up of the clutch pin. If no such anti-backup construction were provided, accidental back-up of the clutch pin could result in undesirable movements of the operating shaft 400 and associated mechanisms, which would be particularly undesirable with the heavy-duty components of the present machine.

To assure proper functioning of the clutch release lever 430, the inclined surface 435 thereof extends farther into the path of the clutch pin 423 than the leading clutch pin engaging surface 436, so that when the clutch release lever is depressed by contact of the clutch pin against the leading surface the inclined surface will remain in the path of the clutch pin for proper clutch release operation.

The operating position of the clutch release lever 430 is adjustably fixed by an adjustable positioning screw 441, against which the clutch release lever is biased by the aforementioned spring 437 in clutch operating position. The clutch release lever 430 is pivoted out of clutch pin engagement by a pneumatic cylinder-piston mechanism 442, acting on the end of the lever spaced from the clutch pin, such pivoting releasing the clutch pin to slide longitudinally under the biasing of the clutch pin spring 428 into clutch plate slot engagement for transmission of rotation of the fly wheel 406 into rotation of the operating shaft 400 for cyclical operation of the machine components.

The pneumatic cylinder-piston mechanism 442 is controlled by a valve actuated by a foot pedal 443 shown in FIG. 1. An instantaneous actuation of the pneumatic cylinder-piston will allow the machine to operate through one cycle, with the clutch release lever 430 engaging the clutch pin 423 when it has completed one revolution. If continuous cyclical operation of the machine is desired, the foot pedal may be continuously depressed so that the pneumatic cylinder-piston is retained in lever pivoting position to retain the clutch release lever out of clutch pin engagement, thus permitting the clutch means to rotate continuously with the fly wheel through repeated machine cycles.

The present invention has been described in detail above for purposes of illustration only and is not intended to be limited by this description or otherwise except as defined in the appended claims.

We claim:

1. In a fastener forming and inserting machine incorporating a wire feed mechanism, a fastener forming knife mechanism and fastener inserting means, the improvement which comprises an operating shaft having clutch dog housing means fixed thereon and bearing means freely rotatably carrying a flywheel fitted with a clutch plate for engagement by a clutch dog, said clutch dog being located in said housing means and biased toward engagement with said clutch plate, and a clutch control arm mounted adjacent said operating shaft for selectively maintaining said clutch dog at a retracted inactive position free of said clutch plate and releasing it to the bias thereon for extension to an engaged position at said clutch plate, said control arm being pivotally mounted and being biased to assume normally a pivoted obstructing disposition in the path through which said clutch dog moves upon rotation of said shaft, said control arm and clutch dog each being formed with complementary faces presenting opposing cam surfaces disposed for abutment at the normal pivoted disposition of said control arm and acting to force said clutch dog to said inactive position upon such abutment, said control arm having a notch adjacent the cam surface thereof for retaining said clutch dog against backing-off of said cam surface after abutment therewith.

2. In a fastener forming and inserting machine, the improvement defined in claim 1 and further characterized in that manually actuated control means is provided for displacing said pivoted control arm from said normal obstructing disposition to release said clutch dog to engage said clutch plate and for maintaining said clutch arm so displaced as long as desired.

No references cited.

GRANVILLE Y. CUSTER, JR., *Primary Examiner.*